United States Patent
Nakamura et al.

(10) Patent No.: US 6,813,135 B2
(45) Date of Patent: Nov. 2, 2004

(54) VARIABLE CAPACITOR AND METHOD FOR MANUFACTURING SAME

(75) Inventors: Kunihiko Nakamura, Kanagawa (JP); Yoshito Nakanishi, Tokyo (JP); Norisato Shimizu, Kanagawa (JP); Yasuyuki Naito, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/626,963

(22) Filed: Jul. 25, 2003

(65) Prior Publication Data

US 2004/0165323 A1 Aug. 26, 2004

(30) Foreign Application Priority Data

Jul. 30, 2002 (JP) ........................................ 2002-221010

(51) Int. Cl.[7] .................................................. H01G 5/00
(52) U.S. Cl. ...................... 361/277; 361/278; 29/25.42
(58) Field of Search .............................. 361/277, 278, 361/290, 299.2, 299.5; 29/25.41, 25.42

(56) References Cited

U.S. PATENT DOCUMENTS 5,159,524 A * 10/1992 Hasegawa et al. .......... 361/271
5,818,683 A    10/1998 Fujii
5,901,031 A *  5/1999 Ishige et al. ................ 361/277

FOREIGN PATENT DOCUMENTS

JP  10-070040  3/1998
JP  09-063890  10/1998

OTHER PUBLICATIONS

Kenichiro Suzuki et al., "A Micromachined RF Microswitch Applicable to Phase–Array Antennas", 1999 IEEE MTT–S Digest, pp. 1923–1926.

* cited by examiner

*Primary Examiner*—Anthony Dinkins
(74) *Attorney, Agent, or Firm*—RatnerPrestia

(57) ABSTRACT

A variable capacitor of the invention includes a beam having flexibility and an electrode provided close to the beam in order to form a capacitor with the beam. By applying a voltage to between the beam and the electrode to thereby deflect the beam by an electrostatic force, a capacitance between the both is changed. The deflected beam and the electrode are placed into contact through an insulation layer formed on a surface of at least one thereof, to change a contact area thereof, thereby changing the capacitance. Meanwhile, the electrode is divided in plurality. A recess is formed such that one electrode is lower than a height of another electrode surface. By applying a voltage to the beam and the electrode corresponding to the recess, the beam is pulled to an inside of the recess, thereby enabling to eliminate stiction.

19 Claims, 12 Drawing Sheets

VARIABLE CAPACITOR AND METHOD FOR MANUFACTURING SAME

FIELD OF THE INVENTION

This invention relates to a mechanical variable capacitor and, more particularly, to a variable capacitor small in size and high in performance and quality, for use on a densely integrated electric circuit, and to a method for manufacturing the same.

BACKGROUND OF THE INVENTION

Figures 1A, 1B, 1C:
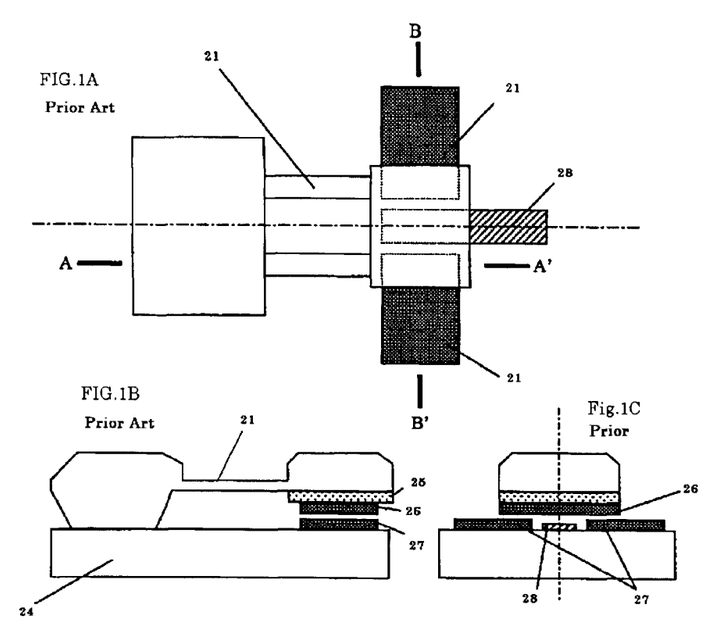
FIG. 1A is a plan view showing a micro-wave switch structure utilizing a conventional variable capacitor structure.
FIG. 1B is a sectional view on line A—A' in FIG. 1A
FIG. 1C is a sectional view on line B—B' in FIG. 1A.

A variable capacitor is utilized as a microfabricated mechanical switch using a variable capacitance structure. FIGS. 1A–1C show a microwave switch introduced in IEEE MTT-S Digest 1999, pp. 1923–1926.

A gold contact 26 is provided, through an insulation layer 25, at a tip lower part of a silicon cantilever 21. On a surface opposed to the contact 26, there are provided a circuit terminal 27 for forming a close circuit upon contacted with the contact 26, and a driving electrode 28 for providing an electrostatic force to the contact 26 to thereby deflect the silicon cantilever 21. The silicon cantilever 21 has a length of approximately 200 $\mu$m, a width of approximately 20 $\mu$m and a thickness of approximately 2.5 $\mu$m. The contact 26 and the circuit terminal 27 has a gap set at 10 $\mu$m or less. By applying a voltage of 50 V or higher to the driving electrode 28, the beam 21 deflects to place the contact 26 into contact with the circuit terminal 27, thereby closing the contact.

However, because the voltage required for closing the contact is as high as 50 V or greater, there is a need to mount an exclusive booster circuit, posing hindrance against miniaturizing the switch element. Also, as the area is broader in the pad formed at the tip of the silicon cantilever 21, the more the viscosity resistance of ambient air is undergone during vertical driving, to decrease the operation speed. High speed switching on a several is order is difficult to attain.

Figure 2:
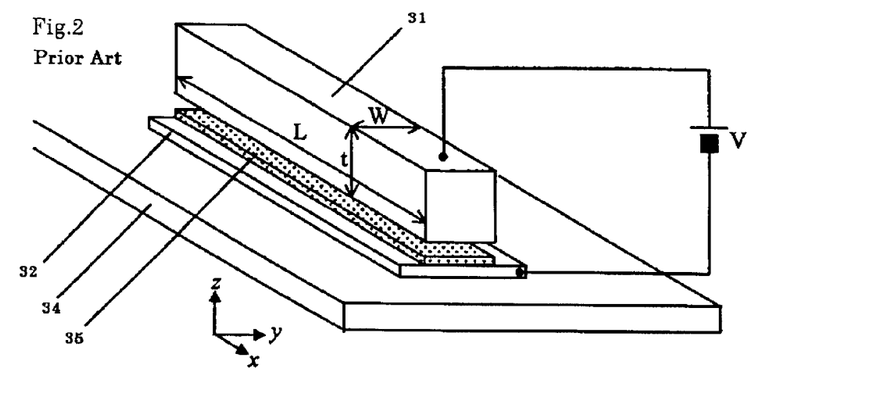
FIG. 2 is a perspective view showing a conventional beam structure that low-voltage, high-speed operation is possible.

FIG. 2 is a conventional beam structure that enables a low voltage driving and switching speed on an order of several $\mu$s. A beam 31 has a size of a width W=2 $\mu$m, a thickness t=2 $\mu$m and a length L=500 $\mu$m. On the substrate 34, an electrode 32 formed, on its surface, an insulation layer 35 having a film thickness of 0.01 $\mu$m is arranged through an air gap of 0.6 $\mu$m to the beam 31. In case a voltage V is applied to between the beam 31 and the electrode 32, the beam 31 deflects in –z direction due to an electrostatic force. At a pull-in voltage or higher, the electrostatic force becomes greater than a restoration force of the beam 31 thereby increasing the force. Accordingly, the beam 31 is immediately attracted onto the insulation layer 35. If the voltage is raised furthermore, the beam 31 gradually increases the capacitance with the electrode 32 while increasing the contact area with the insulation layer 35.

In this manner, the beam 31 can be weakened in springiness by increasing the length of the beam 31. Also, by narrowing the width of the beam 31 and thereby reducing the viscosity resistance of air, it is possible to attain low-voltage driving and switching speed on an order of several $\mu$s. When the beam 31 uses, as material, aluminum having a Young's modulus 77 GPa, the pull-in voltage is 0.25 V in the case the beam 31 is provided as a cantilever and 1.72 V when it is supported at both ends.

However, such an elongate beam geometry involves conspicuous problems of (1) residual stress, (2) thermal expansion, and (3) stiction.

The first problem of residual stress is mentioned. In fabricating a fine beam, used is a thin-film structure using a semiconductor process, a thin-rolled material junction structure, or the like. In any case, the residual stress within the beam is problematic. Such residual stress includes two kinds, i.e. one is compressive/tensile stress to act in a beam lengthwise direction, and the other is stress gradient along a beam thickness direction.

For example, in case the beam of FIG. 2 is assumably a beam supported at both ends, when an excessive compressive stress remains in x and y directions in the figure, the stress release in the y direction does not cause a substantial change in the beam geometry. However, concerning the x direction in which the beam end surface is bound, buckling is caused in order to release stress. Thus, the beam deflects irrespectively of applying an electrostatic force.

Conversely, where tensile stress remains, the beam 31 apparently has no change. However, as the residual tensile stress increases, pull-in voltage increases to conspicuously change the beam driving characteristic. Namely, it is ideal to manufacture a beam with a residual stress of zero. However, unless internal stress is accurately controlled to a predetermined value in the beam manufacture process, variation is incurred in buckling or pull-in voltage, deteriorating element quality.

On the other hand, because this kind of stress on a cantilever is to be released, there is no occurrence of buckling or pull-in voltage variation. However, when the beam 31 is a cantilever, a stress gradient if exists in the z direction or in the beam thickness direction results in upward warps in the beam due to stress release. For example, in case a plus stress gradient 2 MPa/$\mu$m exists along the z direction within the beam, the beam at its tip warp up 2 $\mu$m. Unless the stress gradient value can be accurately controlled to a predetermined value in the beam manufacture process, there occurs variation in warp degree whereby it becomes impossible to suppress the capacitance-decrease variation and pull-in voltage increase variation due to increase in the distance between the beam 31 and the electrode 32. For example, pull-in voltage is 0.25 V in the case the stress gradient is zero in the absence of a warp, whereas pull-in voltage increases up to 1.2 V in the state of warping up 2 $\mu$m at the tip.

It is quite difficult to control, in the manufacture process of the beam, the compressive/tensile strength in the lengthwise direction and the stress gradient in the thickness direction. Although there is "anneal" as a stress relaxing method in the manufacture process, this process is to expose a device to an elevated temperature which temperature has an effect upon the device structuring members other than the beam. For example, in case the sacrificial material or the like, temporarily provided beneath the beam and finally etched away in order to make an electrode metal or beam in a bridge structure, is exposed to an elevated temperature, the material characteristic thereof changes. For this reason, because the element cannot be exposed to a high temperature, it is impossible to completely remove stress.

In the second thermal expansion problem, the beam causes therein thermal expansion in a lengthwise direction due to temperature rise around the element. In the both-ends-supported beam structure bound at both ends, the beam causes buckling to deflect irrespectively of electrostatic force application.

Figure 3:
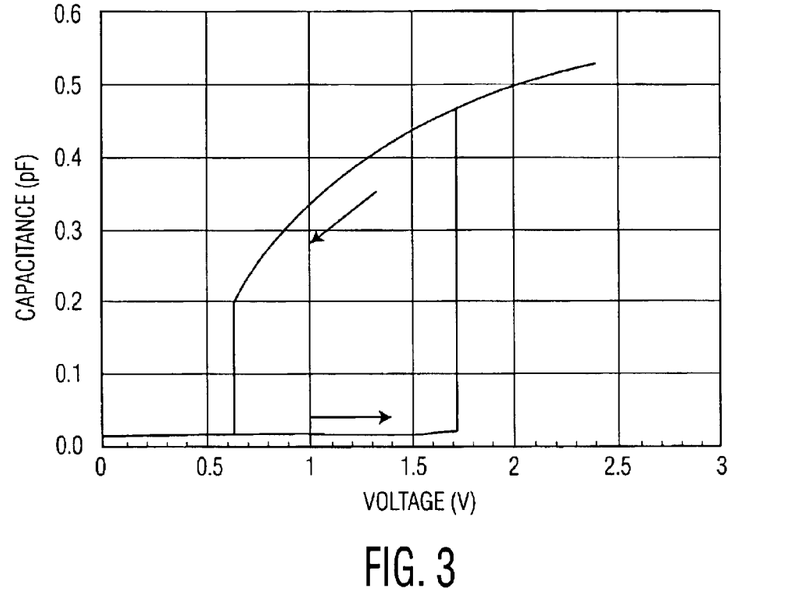
FIG. 3 is a characteristic diagram representing a relationship between an application voltage and a capacitance change in the case the beam is a both-ends-supported beam having a residual tress of nearly zero, in the microwave switch of FIG. 2.

Next, the third stiction problem is mentioned. FIG. 3 represents a relationship between a voltage and a capacitance in the case residual stress is suppressed nearly zero on a structure that the beam 31 of FIG. 2 is made in a both-end-supported type. In case voltage is applied, pull-in takes place at 1.72 V. In case a voltage equal to or greater than that is applied, the beam 31 and the electrode 32 go into contact through the insulation layer 35, increasing the contact area and hence the capacitance. Conversely, in case voltage is lowered, when the voltage is lowered down to 0.64 V, the contact between the beam 31 and the electrode 32 is gradually released. This is because of weak springiness, or spring restoration force, of the beam 31. This means that, when the voltage is returned to 0 V, in case there exists an adsorbing force through the ambient water molecules, an adsorbing force due to residual charge or a van der Waals force in the contact area, the beam 31 cannot return to the initial state with high possibility. In order to avoid this, there requires a complicated structure, including a mechanism to forcibly drive the beam 31 in a direction separated from the electrode 32, e.g. newly providing an electrode for pulling back the upper surface of the beam 31 of the FIG. 2 by an electrostatic force.

There is a structure described in U.S. Pat. No. 5,818,683, as a prior art of variable capacitance the stiction problem is avoided. In this structure, the electrode opposed to the cantilever is divided as a driving electrode close to the root and a detection electrode positioned close to the beam tip. It is only the driving electrode that contributes to deflecting the beam on an electrostatic force. The slight deflection amount of the beam is controlled within a voltage range that pull-in-does not take place between the beam and the driving electrode. Utilizing a beam displacement at around the beam tip magnified on that principle, a capacitance change to the detection electrode is obtained.

In this structure, the problem of stiction is avoided because of control not to cause contact between the beam and the electrode. However, in also this structure, unless the foregoing stress gradient in beam thickness direction can be controlled in the manufacture process, variation occurs in warping up at the beam tip and hence variation in the capacitance to the detection electrode. Also, warp up decreases the capacitance, making it difficult to obtain a large variable capacitance change.

SUMMARY OF THE INVENTION

It is an object of the present invention to solve the foregoing problem and provide a variable capacitor simple in structure and high in quality, in a mechanical variable capacitor that low-voltage/high-speed driving is possible.

A variable capacitor of the present invention comprises: a beam having flexibility; and an electrode provided close to the beam in order to form a capacitor with the beam; whereby, by applying a voltage to between the beam and the electrode to thereby deflect the beam by an electrostatic force, a capacitance between the both is changed.

Meanwhile, the deflected beam and the electrode are placed into contact through an insulation layer formed on a surface of at least one thereof, to change a contact area thereof, thereby changing the capacitance.

Also, a recess is provided in the insulation layer such that a part of the electrode is lower than a height of a surface of another electrode. By applying a voltage to between the beam and another electrode and pulling the beam in the recess, the beam is separated from adhesion to the electrode, thereby eliminating stiction.

Also, the electrode for deflection by an electrostatic force is divided into plurality in the number. By providing the respective ones with a function to support the beam tip, a function as an alternating current signal line, and a function to eliminate stiction, the quality or performance deterioration due to residual stress, thermal expansion or stiction can be suppressed by a simple structure.

DESCRIPTION OF THE EXEMPLARY EMBODIMENT

Exemplary embodiments of the present invention are demonstrated hereinafter with reference to the accompanying drawings.

1. First Exemplary Embodiment

Figure 4:
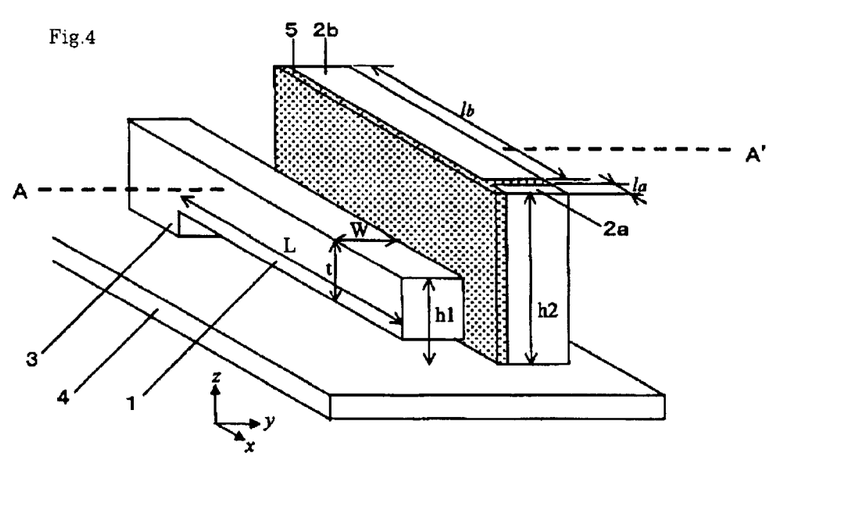
FIG. 4 is a perspective view of a variable capacitor in a first embodiment of the present invention.

FIG. 4 is a schematic view of a variable capacitor according to embodiment 1 of the present invention. A beam 1 is a cantilever fixed at its one end on a substrate 4 through an anchor 3, which has a thickness t=2 $\mu$m, a width W=2 $\mu$m and a length L=500 $\mu$m. The beam herein uses a material of aluminum having a Young's modulus 77 of GPa. Electrodes 2a, 2b are fixed in parallel with a side surface of the beam 1 on the substrate 4 with a gap of 0.6 $\mu$m. The electrode 2a has a length 1a of approximately 50 $\mu$m while the electrode 2b has a length 1b of approximately 450 $\mu$m. In order to avoid an electrical short-circuit at between the beam 1 and the electrode 2, an insulation layer 5 is formed about 0.01 $\mu$m on the opposite surfaces of the electrode 2 and the beam 1. Herein, the upper surface height h2 of the electrode 2 is provided higher than an upper surface height h1 of the beam 1.

Figure 5:
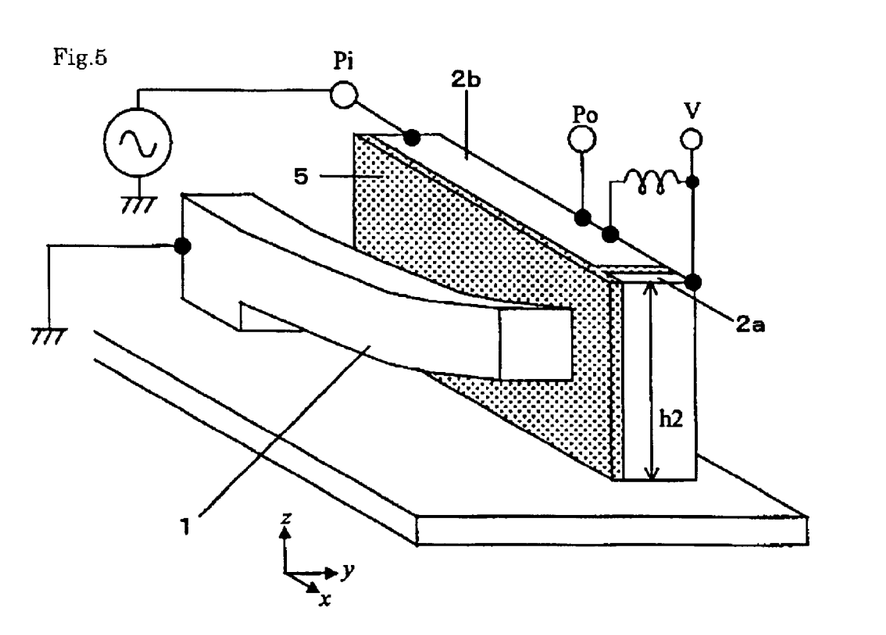
FIG. 5 is a perspective view explaining a geometrical change of the beam of the variable capacitor in a first embodiment of the invention due to releasing a beam internal stress thereof.
Figure 6:
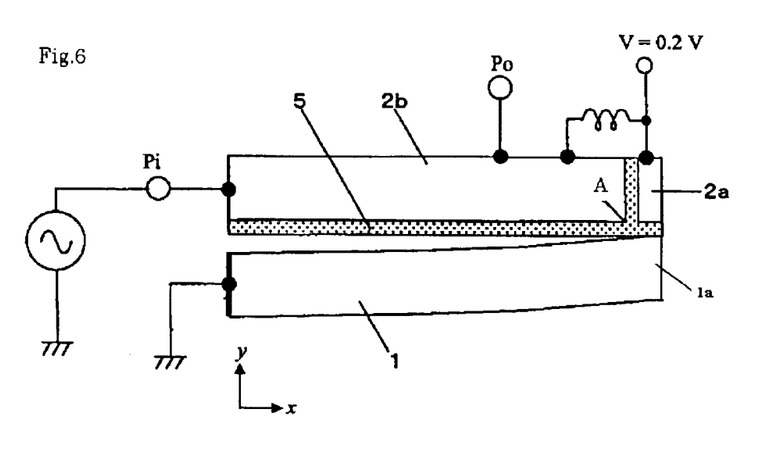
FIG. 6 is a plan view representing a state a beam tip is supported by an electrostatic force, in the variable capacitor in a first embodiment of the invention.

The beam 1, because of a cantilever, can release tensile/compressive stress in x and y directions and stress gradient in z direction. FIG. 5 shows the actual geometry of the beam released of stress. Because the stress gradient remains nearly 2 MPa/μm in z direction, there is warp up approximately 2 μm at the tip. The electrode 2 has a height h2 covering it sufficiently. Accordingly, there is no change in the opposed area between the beam 1 and the electrode 2, and hence there is no reduction in the capacitance thereof. In case the beam 1 is grounded as shown in FIG. 5 and a voltage is applied to the electrode 2, the beam 1 is attracted in the y direction, thereby causing pull-in at 0.25 V. By somewhat returning the voltage to 0.20 V, the beam 1 assumes a state the tip 1a is fixedly supported on the electrode 2a as shown in FIG. 6. Because the cantilever is readily affected by external vibration, usually a voltage is applied to the electrode 2 thereby being kept in a both-ends fixed state as shown in FIG. 6. The electrode 2 is released of voltage as required and returned to the cantilever state, so that refresh operation can be made to relax the internal stress generation due to thermal expansion.

In case the upper surface height h2 of the electrode 2 in FIG. 4 is provided equal to the upper surface height h1 of the beam 1, the opposite surface between the beam 1 and the electrode 2 is decreased by the warp of the beam 1 in the z direction due to releasing the stress, resulting in a pull-in voltage of as high as 0.42 V. It can be seen, from this, that to provide the height h2 higher than the height h1 obtains an effect to suppress against pull-in voltage rise.

In the structure of FIG. 5, the electrode 2 for applying an electrostatic force to the beam 1 and deforming the same is separated into two. The one electrode 2b is provided with a function as an alternating current signal line having an input port Pi and output port Po, thereby forming an alternating current signal circuit.

It is possible to consider the structure of FIG. 5 as a mere actuator and provide a movable member coupled to the beam 1 thereby forming a variable capacitance part exclusive for alternating current signals. In this case, however, because the structure is complicated and further the movable member including the beam 1 has an increased mass, the operation speed, particularly switching speed when used as a switch, is decreased. For this reason, embodiment 1 takes a structure to use a part of the electrode 2 also as an alternating current signal line as shown in FIG. 5, to simplify the structure and achieve high-speed switching.

Figure 7:
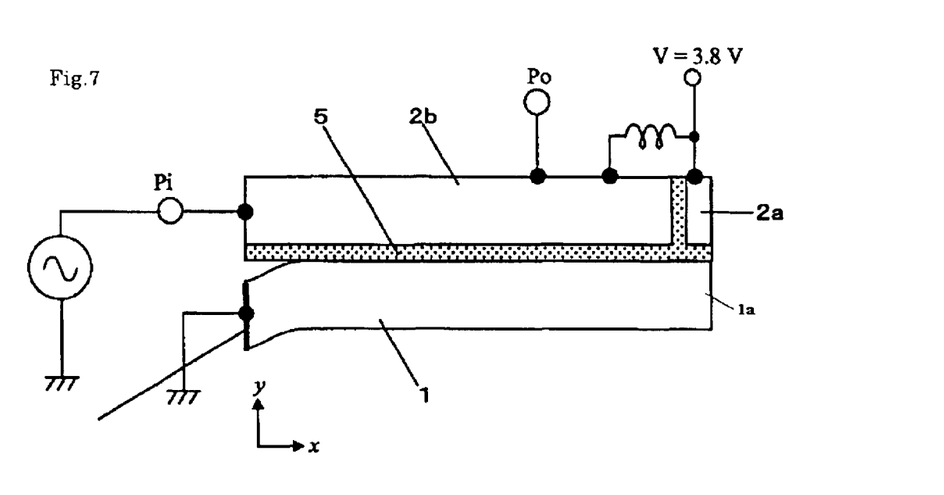
FIG. 7 is a plan view showing a state that a shunt type switch is provided on an alternating current signal line, in the variable capacitor in a first embodiment of the invention.

When the voltage is further raised from the state of FIG. 6. the beam 1 and the electrode 2b increase the contact area through the insulation layer 5 as shown in FIG. 7, thereby increasing the capacitance. Because the beam 1 and the electrode 2b form a shunt-type switch, the beam 1 and the electrode 2 in a state applied by a voltage 3.8 V as shown in FIG. 7 are in a contacted state at 80% of the opposed area, making it possible to form a state the alternating current transmission line at between Pi and Po is reduced down to zero potential by shunting.

Figure 8:
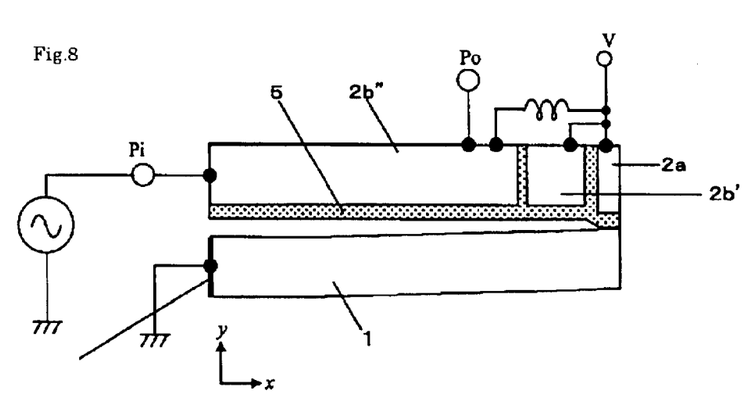
FIG. 8 is a plan view explaining a structure to reduce the parasitic capacitance on a signal line, in the variable capacitor in a first embodiment of the invention.

In the state of FIG. 6, i.e. in the state grounding is not provided by shunting, in the case that the capacitance at around a part-A where the beam 1 and the electrode 2b are neared is not negligible as a parasitic capacitance, the problem of parasitic capacitance can be solved by taking a structure of FIG. 8. In FIG. 8, the electrode 2a is provided closer to the beam 1 than the electrode 2b. Furthermore, the electrode 2b is divided into two, i.e. an electrode 2b' and an electrode 2b", to arrange an input port Pi and output port Po in the electrode 2b" positioned farer than the part-A, so that an alternating current can be passed through the electrode 2b".

With the structure of FIG. 8, because the beam 1 and the electrodes 2b', 2b" are spaced distant, parasitic capacitance components can be reduced. Incidentally, the electrode 2b', playing a role to drive the beam 1, cannot be omitted.

Figure 9A:
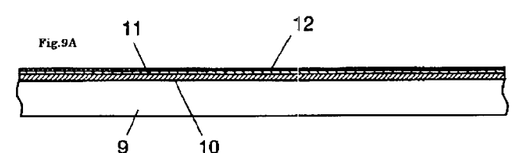
FIGS. 9A–9G are sectional views explaining the variable capacitor manufacturing process in a first embodiment of the invention.

Now explained is the method for manufacturing a variable capacitor of FIG. 4. FIGS. 9A–9G are process sectional views using a section along line A—A' in FIG. 4. As shown in FIG. 9A, a high resistive silicon substrate 9 is thermally oxidized to form a silicon oxide film 10 in a film thickness of 300 nm on a silicon substrate 9. Thereafter, a silicon nitride film 11 is deposited in a film thickness of 200 nm by using a low-pressure CVD technique. Furthermore, a silicon oxide film 12 is deposited in a film thickness of 50 nm by using a low-pressure CVD technique.

Figure 9B:
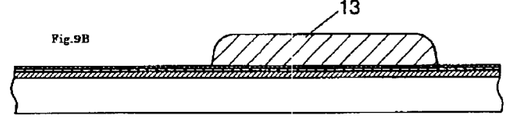

Next, as shown in FIG. 9B, in order to form a sacrificial layer 13 on the silicon oxide film 12, photoresist is spin-coated in a film-thickness of 2 μm. After exposure to light and development, baking is conducted on a hot plate at 140° C. for 10 minutes, thereby forming a sacrificial layer 13.

Figure 9C:
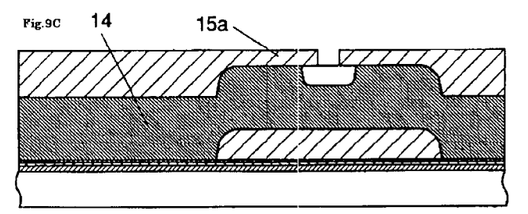

Thereafter, as shown in FIG. 9C, aluminum 14 is deposited in a film thickness of 2 μm over the entire substrate surface by sputtering. Photoresist patterning 15a is made in a manner leaving the resist in a predetermined area. Through a penetration hole in the resist pattern 15a, part of aluminum 14 is etched to thereby reduce its height.

Figure 9D:
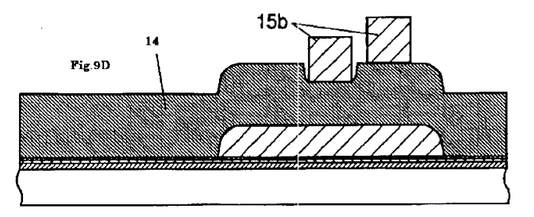

Next, as shown in FIG. 9D, after removing away the resist pattern 15a, a photoresist pattern 15b is again formed in and adjacent the position the aluminum 14 is lowered in surface.

Figure 9E:
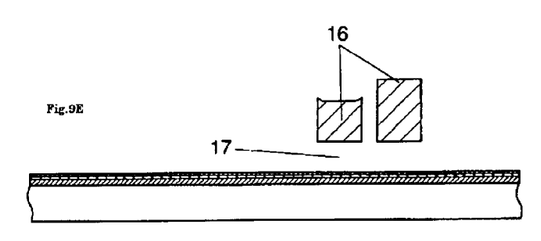

Next, as shown in FIG. 9E, the pattern 15b is used as a mask to carry out dry etching on aluminum 14, thereby forming a beam 16. Furthermore, the pattern 15b and sacrificial layer 13 is removed by oxygen plasma. Due to this, the beam 16 is formed having a silicon oxide film 12 and gap 17 on the silicon substrate surface.

Figure 9F:
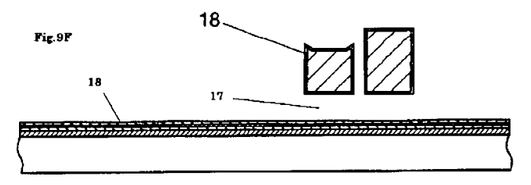

Furthermore, as shown in FIG. 9F, a silicon nitride film 18 is deposited in a film thickness of 50 nm over the silicon oxide film 12 on the substrate surface as well as on the entire surface of the beam 16, by a plasma CVD technique. Due to this, a silicon nitride film 18 is formed on the silicon oxide film 12 on the substrate surface and around the beam 16.

Figure 9G:
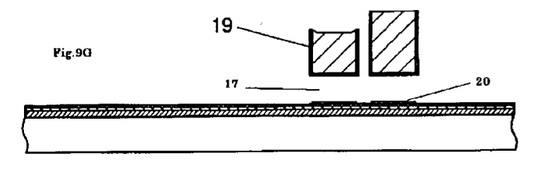

Finally, as shown in FIG. 9G, the silicon nitride film 18 in the upper surface of the beam 16 and in an area of the silicon oxide film 12 on the substrate surface not opposed to the beam 16 is etched by a dry etching method having anisotropy, under a condition having a selective ratio of a film thickness greater than the deposition film thickness, e.g. 100 nm to the silicon oxide film. This forms a beam 19 not having a silicon nitride film on the upper surface but left with a nitride film on side surfaces as well as a silicon nitride film as an insulation film 20 in a position opposed to the beam 19 on the substrate. Electrical conduction for applying a voltage to the beam 19 can be taken at its upper surface removed of the silicon nitride film 18.

Incidentally, although the substrate in FIGS. 9A–9G used the high resistive silicon substrate 9, it may use a usual silicon substrate, a compound semiconductor substrate or an insulation material substrate.

Also, although the silicon oxide film 10, the silicon nitride film 11 and the silicon oxide film 12 were formed as insulation films on the high resistive silicon substrate 9, these insulation films may be omittedly formed where the silicon substrate 9 has a sufficiently high resistance. Meanwhile, on the silicon substrate 9 was formed the three-layer structured insulation film having the silicon oxide film 10, silicon nitride film 11 and silicon oxide film 12. However, in the case that the silicon nitride film 11 has a film thickness sufficiently greater as compared to the silicon nitride film deposited on the beam, i.e. a film thickness not to vanish even passed through so-called an etch back process, the silicon oxide film 12 forming process can be omitted.

Meanwhile, the material forming the beam used aluminum. Alternatively, this may use another metal material, such as Mo, Ti, Au, Cu or the like, a semiconductor material introduced with an impurity in a high concentration, e.g. amorphous silicon, or a polymer material having conductivity.

Furthermore, although sputtering was used as a film-forming method, forming may be by a CVD process, a plating process or the like.

2. Second Exemplary Embodiment

Figure 10:
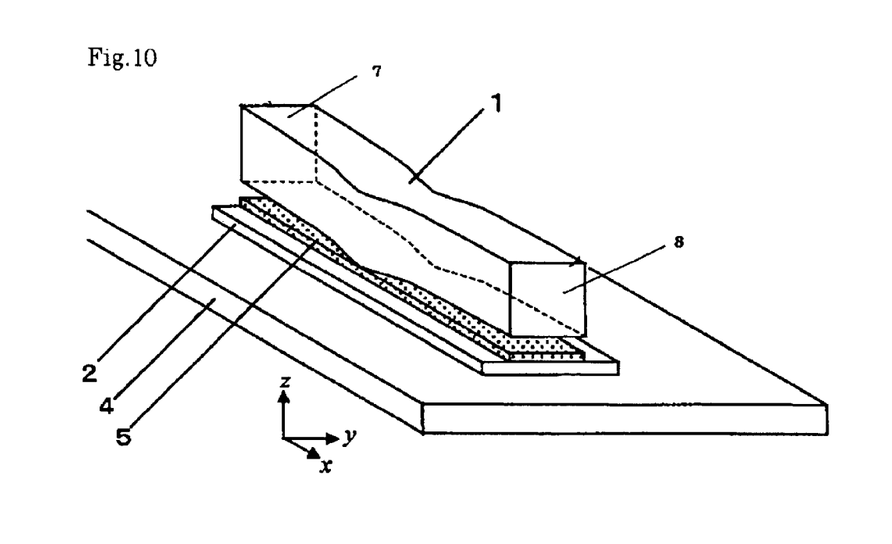
FIG. 10 is a perspective view representing a state of stiction caused in a both-ends-supported beam of the variable capacitor in a first embodiment of the invention.

In the case that the beam 1 in the structure of FIG. 4 is made as a both-ends-supported beam through a support member 7, 8, there is a possibility that, when voltage is released after the beam 1 is once contacted by pull-in with an insulation layer 5 as shown in FIG. 10, the beam at its center cannot be separated from an insulation layer 5 due to stiction. Embodiment 2 is to solve this.

Figure 11A:
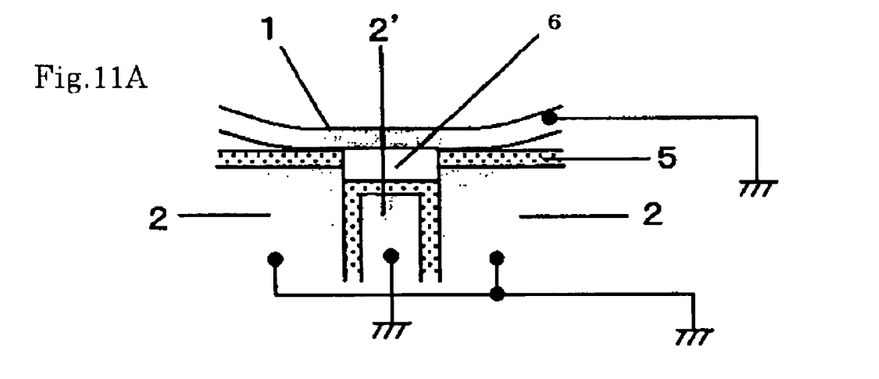
FIGS. 11A and 11B are sectional side views explaining the principle of a stiction eliminating structure of a variable capacitor in a second embodiment of the invention.
Figure 11B:
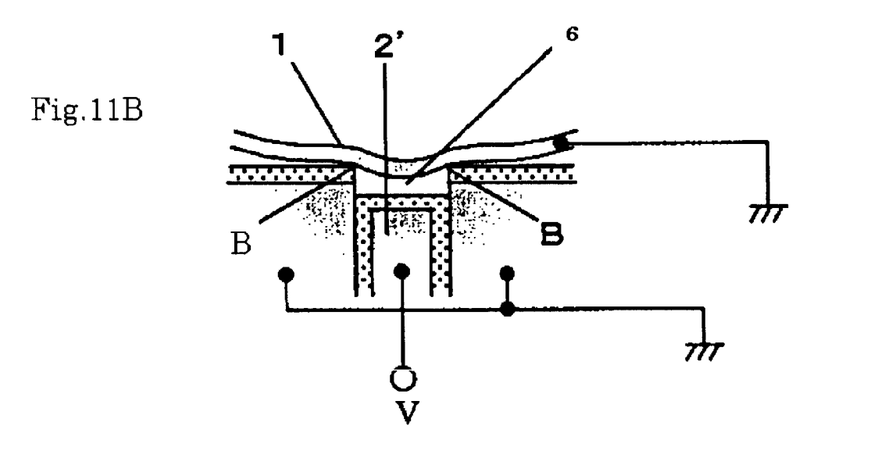
Figure 12:
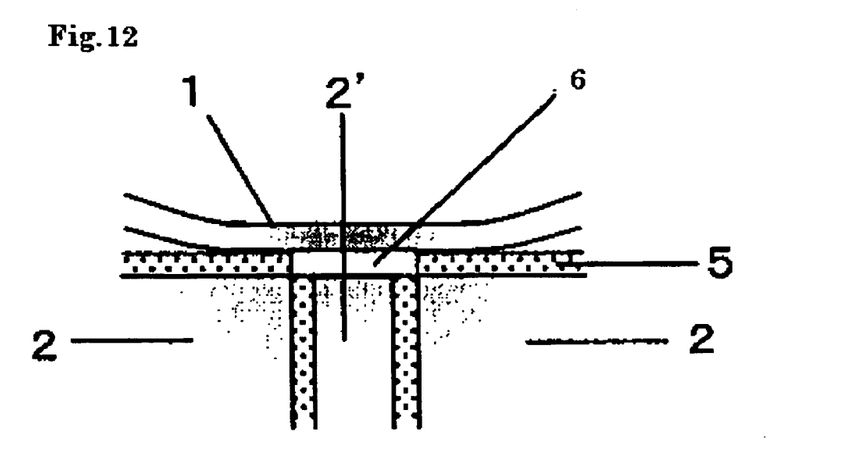
FIG. 12 is a sectional side view explaining a structure forming a recess by a step of insulation layer, in a variable capacitor of a second embodiment of the invention.

FIG. 11A is a magnifying view of a central part of the beam 1 causing stiction, wherein the beam 1 is in a planar contact with the insulation layer 5 on an electrode 2. In the contact surface, there are acted an adsorbing force through ambient water molecules, an electrostatic force due to residual charge, a van del-Walls force and so on. An electrode 2', distant farer from the beam 1 than an electrode 2, is formed with a recess 6, without having a contact with the beam 1. Herein, in case a voltage is applied to the electrode 2', the beam 1 is pulled inward of the recess 6 as shown in FIG. 11B. A force, to separate the attracted beam 1 to the electrode 2, is exerted with respect to a step generating point B as a fulcrum, enabling to eliminate stiction. FIG. 12 is a structure that electrodes 2, 2' have respective surfaces in the same plane but a recess 6 is provided only in the insulation layer 5 of the electrode 2', similarly obtaining the effect to eliminate stiction.

By vacuum-sealing the variable capacitor of embodiment 2, it is possible to reduce the stiction caused by ambient water molecules. This further enhances the stiction eliminating effect.

As described above, according to the present invention, an electrode is divided into a plurality in the number, the respective of which are provided a function to support a beam tip, a function as an alternating current signal line, and a function to eliminate stiction. This provides an effect to suppress residual stress, thermal expansion, suppressing the deterioration in quality or performance due to stiction. Due to this, obtained is the effect that it is possible to realize a small-sized high-quality variable capacitor that can be driven at high speed on low voltage or an RF switch utilizing the same.

What is claimed is:

1. A variable capacitor comprising:
   a beam having flexibility; and
   an electrode provided close to the beam;
   whereby, by applying a voltage to between the beam and the electrode to thereby deflect the beam on an electrostatic force, a capacitance between the beam and the electrode is changed.

2. A variable capacitor according to claim 1, wherein the deflected beam and the electrode are placed in contact through an insulation layer formed on a surface of at least one thereof, to change a contact area thereof.

3. A variable capacitor according to claim 1, wherein the electrode is divided into a plurality in the number.

4. A variable capacitor according to claim 3, wherein the electrode is divided into two, a first electrode being formed with an alternating current signal line provided with an input port and output port, to apply a voltage to between a second electrode and the beam.

5. A variable capacitor according to claim 4, wherein the second electrode is to support a free end of the beam by attraction with an electrostatic force.

6. A variable capacitor according to claim 4, wherein the second electrode is arranged closer to the beam than the first electrode.

7. A variable capacitor according to claim 1, wherein the electrode has a surface in parallel with a deflecting direction and lengthwise direction of the beam in a deflected state released of residual stress, the electrode having a geometry greater than a geometry of a side surface of the beam opposed to the electrode.

8. A variable capacitor according to claim 1, wherein the beam is a cantilever.

9. A variable capacitor according to claim 1, wherein the variable capacitor is vacuum-sealed.

10. A switch utilizing a variable capacitor structure of the variable capacitor according to claim 1.

11. A variable capacitor according to claim 1, wherein the beam is a both-ends-supported beam, the electrode being divided into a plurality in the number, one divided electrode having a surface formed distant farer from a surface of the beam than a surface of another electrode.

12. A variable capacitor according to claim 11, wherein each of the electrodes divided in plurality has an insulation layer provided on a surface thereof, the insulation layer of one electrode having a surface formed distant farer from a surface of the beam than a surface of the insulation layer of another electrode.

13. A variable capacitor according to claim 12, wherein one electrode is removed of the insulation layer in a surface opposed to the beam, the one electrode being distant farer from a surface of the beam than a surface of the insulation layer of another electrode.

14. A variable capacitor according to claim 11, wherein the surface of the insulation layer of the one electrode is distant farer from the surface of the beam than the surface of the insulation layer of another electrode thereby forming a recess at between the one electrode and the beam, so that, by applying a voltage to between the one electrode and the beam and thereby pulling the beam in the recess, a force can be generated to separate an opposite position of the beam from the electrode with respect to, as a fulcrum, a step generating point in a part of the recess.

15. A variable capacitor according to claim 11, wherein the variable capacitor is vacuum-sealed.

16. A switch utilizing a variable capacitor structure of the variable capacitor according to claim 11.

17. A method for manufacturing a variable capacitor comprising:
   a step of forming a sacrificial layer on a substrate;
   a step of forming a beam material over an entire surface of the substrate by sputtering;
   a step of forming a mask pattern over said beam material;
   a step of carrying out dry etching using the pattern as a mask and form a beam; and
   a step of removing the pattern and the sacrificial layer.

18. A method for manufacturing a variable capacitor according to claim 17, further comprising a step of forming a first silicon oxide film on the substrate and thereafter depositing a silicon nitride film, to form a sacrificial layer on the silicon nitride film.

19. A method for manufacturing a variable capacitor according to claim 18, further comprising a step of depositing a second silicon oxide film on the silicon nitride film, to form a sacrificial layer on the second silicon oxide film.

* * * * *